US008179884B1

(12) United States Patent
Mangal et al.

(10) Patent No.: US 8,179,884 B1
(45) Date of Patent: May 15, 2012

(54) SYSTEM AND METHOD FOR ASYMMETRIC COMMUNICATIONS AND CONTROL IN A WIRELESS WIDE AREA NETWORK

(75) Inventors: Manish Mangal, Overland Park, KS (US); Mark Yarkosky, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 618 days.

(21) Appl. No.: 12/368,595

(22) Filed: Feb. 10, 2009

Related U.S. Application Data

(62) Division of application No. 11/044,674, filed on Jan. 27, 2005, now Pat. No. 7,525,954.

(51) Int. Cl.
*H04J 1/00* (2006.01)
*H04L 12/66* (2006.01)
*H04W 4/00* (2009.01)

(52) U.S. Cl. ......... 370/352; 370/331; 370/338; 455/432

(58) Field of Classification Search .......... 370/328–338, 370/401–465, 342–352; 455/504–522, 432–465; 709/222–232
See application file for complete search history.

(56) References Cited

U.S. PATENT DOCUMENTS

| | | | |
|---|---|---|---|
| 6,728,226 B1 * | 4/2004 | Naito | 370/328 |
| 6,791,952 B2 | 9/2004 | Lin et al. | |
| 6,879,581 B1 * | 4/2005 | Leung | 370/352 |
| 7,039,027 B2 | 5/2006 | Bridgelall | |
| 7,133,669 B2 | 11/2006 | Nair et al. | |
| 7,149,521 B2 | 12/2006 | Sundar et al. | |
| 7,254,119 B2 | 8/2007 | Jiang et al. | |
| 7,280,546 B1 * | 10/2007 | Sharma et al. | 370/401 |
| 7,437,157 B1 * | 10/2008 | Satapathy | 455/435.1 |
| 7,525,954 B1 | 4/2009 | Mangal et al. | |
| 7,623,866 B1 * | 11/2009 | Spitzer | 455/442 |
| 7,668,078 B2 * | 2/2010 | Balasubramanian et al. | 370/209 |
| 7,684,808 B1 * | 3/2010 | Woleben et al. | 455/450 |
| 7,965,693 B2 * | 6/2011 | Jiang et al. | 370/338 |
| 2002/0147008 A1 | 10/2002 | Kallio | |
| 2003/0032451 A1 | 2/2003 | Hu | |
| 2004/0014474 A1 | 1/2004 | Kanada | |
| 2004/0133806 A1 | 7/2004 | Joong et al. | |
| 2005/0286476 A1 | 12/2005 | Crosswy et al. | |
| 2006/0046728 A1 * | 3/2006 | Jung et al. | 455/445 |
| 2007/0082671 A1 | 4/2007 | Feng et al. | |
| 2007/0191044 A1 * | 8/2007 | Kostic et al. | 455/522 |
| 2007/0270145 A1 | 11/2007 | Feng et al. | |

* cited by examiner

*Primary Examiner* — M. Phan

(57) ABSTRACT

An access point for a wireless wide area network might receive a request from a wireless device to establish a session on the wireless wide area network. In response, the access point might establish a circuit switched uplink channel and a packet switched downlink channel for communications with the wireless device during the session. The access point might communicate with other wireless devices in this manner as well. Additionally, the access point might employ power control methods for the circuit switched uplink channels, and it might employ rate control methods for the packet switched downlink channels.

5 Claims, 5 Drawing Sheets

SYSTEM AND METHOD FOR ASYMMETRIC COMMUNICATIONS AND CONTROL IN A WIRELESS WIDE AREA NETWORK

CROSS-REFERENCE TO RELATED APPLICATIONS

This is a division of application Ser. No. 11/044,674, filed Jan. 27, 2005, now U.S. Pat. No. 7,525,954, which application is incorporated herein by reference.

FIELD OF THE INVENTION

This invention relates generally to wireless wide area networks. More specifically, it relates to systems and methods for asymmetric communications and power control in wireless wide area networks.

BACKGROUND OF THE INVENTION

Wireless devices can access a wireless wide area network ("WWAN") for voice or data services. Depending on the type of WWAN, various different types of connections might be used to provide the wireless devices with access to the WWAN. For example, in a third generation ("3G") code division multiple access ("CDMA") network, an access point for the WWAN might establish a circuit switched connection with a wireless device. As such, dedicated uplink (i.e., from the wireless device to the access point) and downlink (i.e., from the access point to the wireless device) channels are established for the connection.

A circuit switched connection is typically limited by the downlink channel (also referred to as the forward channel) rather than the uplink channel (also referred to as the reverse channel). That is, in a typical connection with a WWAN, on average more data is transmitted from the access point to the wireless device than is transmitted from the wireless device to the access point. This unequal utilization of the uplink and downlink channels might therefore result in an inefficient usage of the WWAN's resources.

As an alternative to a circuit switched connection, the access point might establish a packet switched connection with a wireless device. In a packet switched connection, a wireless device and the access point might communicate via shared packet data channels rather than dedicated circuit switched channels. In a 3G CDMA network, for example, a packet switched connection might be a data connection for sending data, or alternatively it might be used for sending voice, such as by using Voice over Internet Protocol ("VoIP") or other such packet backed voice protocols.

Although packet switched connections are obtaining increasingly greater data rates (e.g., 144 kb/s or 3.1 Mb/s in current 3G networks), there still are limitations to using packet switched connections. For example, the noise rise over thermal on the reverse channel of a packet switched connection limits the total number of VoIP users that an access point might be able to support at the same time. Thus, where circuit switched connections might generally be limited by the downlink channels, packet switched connections might generally be limited by the uplink channels. Additionally, the traditional power control methods used for circuit switched connections are not as effective in obtaining an optimal utilization of WWAN resources when they are applied to wireless devices in packet switched connections.

Therefore, there exists a need for improved systems and methods of access and control in wireless wide area networks.

SUMMARY OF THE INVENTION

An access point for a wireless wide area network can receive a request from a wireless device to access the wireless wide area network for voice and/or data services, such as to place a Voice over Internet Protocol call. In response, the access point can establish asynchronous uplink and downlink channels for the session. For example, the access point might establish a circuit switched uplink channel and a packet switched downlink channel. Thus, the wireless device might use a circuit switch channel when sending voice and/or data to the access point, and the access point might use packet switched channel when sending voice and/or data to the wireless device. The access point might additionally communicate with other wireless devices, and it might similarly establish asynchronous uplink and downlink channels with those other wireless devices as well.

In one aspect, the access point might use power control mechanisms to regulate the power levels used by the wireless devices when transmitting signals to the access point via the circuit switched uplink channels. The access point might also use rate control mechanisms to regulate the modulation schemes and rate encoding schemes used by the access point when transmitting signals to the wireless devices via the packet switched downlink channels. Thus, the circuit switched uplink channels might be subject to power control mechanisms, while the packet switched downlink channels might be subject to rate control mechanisms.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Introduction

In one exemplary operation, an access point for a WWAN receives a request from a wireless device to establish a session on the WWAN, such as might be used by the wireless device to access the WWAN for voice and/or data services. In response to the request, the access point might establish the session with asymmetric uplink and downlink channels. For example, the access point might establish a circuit switched uplink channel for communications in the session from the wireless device to the access point. And, the access point might establish a packet switched downlink channel for communications in the session from the access point to the wireless device.

Figure 1:
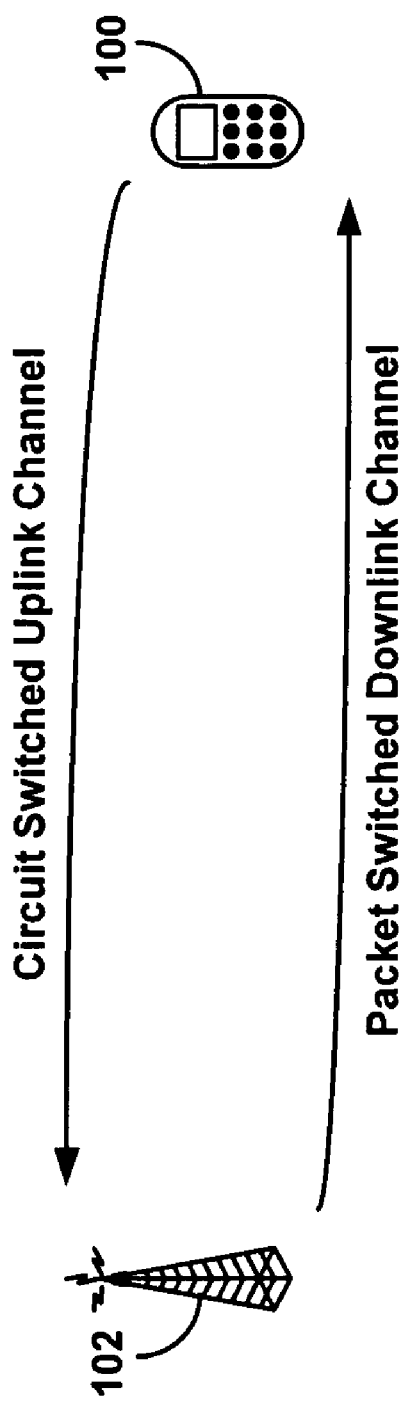
FIG. 1 illustrates exemplary asymmetric uplink and downlink channels used for communications between a wireless device and an access point for a wireless wide area network.

FIG. 1 illustrates exemplary asymmetric uplink and downlink channels used for communications between a wireless device and an access point for a WWAN. As illustrated in this figure, the wireless device 100 and the access point 102 communicate via a circuit switched uplink channel and a packet switched downlink channel. Although this figure only illustrates a single wireless device 100, multiple wireless devices might simultaneously communicate with the access point 102 in order to access the WWAN for voice and/or data services. The access point 102 might also establish asymmetric uplink and downlink channels with one or more of those other wireless devices.

In addition to establishing asymmetric uplink and downlink channels with one or more wireless devices, the access point 102 might also employ asymmetric control methods for its uplink and downlink channels. For example, the access point 102 might use power control methods for the circuit switched uplink channels. The power control methods can be used to regulate the power levels used by the wireless devices when transmitting signals to the access point 102. In contrast, the access point 102 might use rate control methods rather than power control methods for its packet switched downlink channels. The rate control methods might define various modulation schemes and rate encoding schemes used in transmissions from the access point 102 to the wireless devices.

2. Exemplary Architecture

Figure 2:
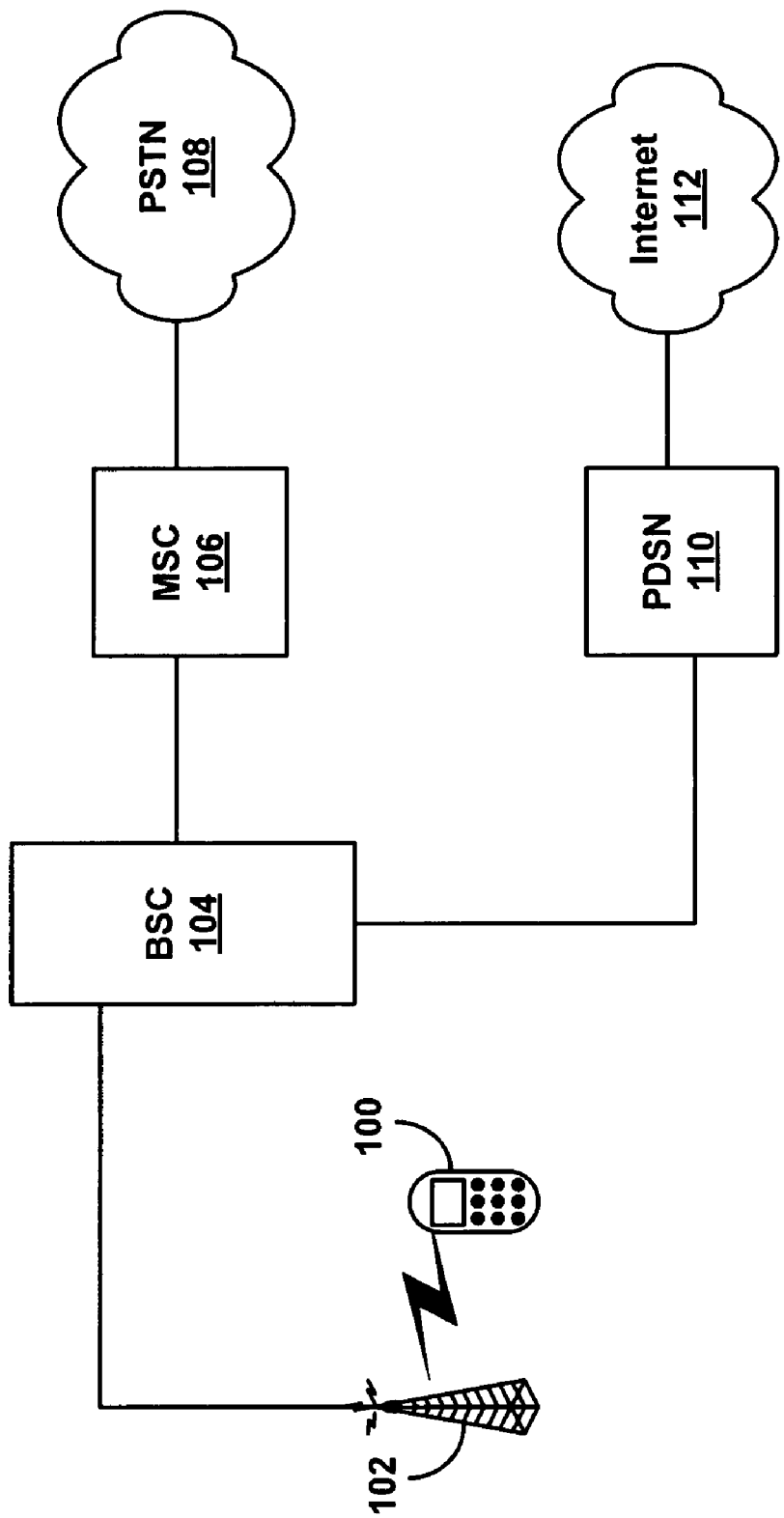
FIG. 2 illustrates an exemplary architecture of a wireless wide area network that supports asymmetric communications and power control.

FIG. 2 illustrates an exemplary architecture of a wireless wide area network that supports asymmetric communications and control methods. The wireless device 100 may be a mobile phone, a personal digital assistant ("PDA"), a wirelessly equipped computer, a two-way radio or another type of wireless device. While FIG. 1 depicts one wireless device 100 accessing the WWAN for voice and/or data services, the WWAN may alternatively simultaneously provide service to a plurality of different wireless devices. Additionally, while the discussion herein refers to WWANs, it should be understood that wireless networks other than WWANs might alternatively be used.

As shown in FIG. 2, the wireless device 100 communicates with an access point for the WWAN, such as a base station 102, through an air interface. The wireless device 100 can communicate with the base station 102 using a variety of different air interface protocols. In an exemplary embodiment, the wireless device 100 communicates with the base station 102 using CDMA. CDMA provides a method for sending wireless signals between the wireless device 100 and the base station 102. In a CDMA system, the base station 102 communicates with the wireless device 100 over a spread spectrum of frequencies.

In a CDMA system, multiple wireless devices may use the same frequency range, and the multiple wireless devices may each simultaneously communicate with the base station 102 using the same frequency range. A wireless device in a CDMA system spreads its signal across the frequency range. Spreading the signal across a wide bandwidth can reduce interference between signals from different wireless devices. In order to perform signal spreading, each wireless device may be assigned a unique code, such as a Walsh code, to be used for modulating communications. The code may be a sequence of bits, such as a 64 bit binary number; however, other lengths may also be used. This can allow individual signals to be differentiated from other signals, and, therefore, accurately recovered.

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

CDMA is merely one example of a protocol that can be used for communication between the wireless device 100 and the access point 102. As other examples, the wireless device 100 and the access point 102 may communicate using Wideband CDMA ("WCDMA"), Time Division-Synchronous CDMA ("TD-SCDMA"), Advanced Mobile Phone Service ("AMPS"), Digital AMPS ("D-AMPS"), Global System for Mobile Communication ("GSM"), General Packet Radio Service ("GPRS"), IS-136, Wireless Application Protocol ("WAP"), time division multiple access ("TDMA"), Integrated Digital Enhanced Network ("iDEN"), HomeRF, HiperLAN, multichannel multipoint distribution services ("MMDS") network, a digital enhanced cordless telecommunications ("DECT"), Bluetooth, IEEE 802.16, IEEE 802.20, any of the various protocols under the IEEE 802.11 umbrella and others may also be used.

The base station 102 couples to a base station controller ("BSC") 104, which can perform various functions such as managing handoffs of the wireless device 100 as it moves among base stations in the WWAN or in other wireless networks. The BSC 104 in turn connects to a mobile switching center ("MSC") 106. The MSC 106 can manage setup and teardown of connections with the wireless device 100. While the BSC 104 and the MSC 106 are depicted as separate components, it is possible that their functionality may be combined into a single component. The MSC 106 can additionally provide connectivity to the public switched telephone network ("PSTN") 108. Through this connectivity, the wireless device 100 may access the WWAN for voice services and in turn establish a circuit switched connection with another device on the PSTN 108, the WWAN or another network.

While a traditional voice connection with the WWAN might involve establishing a circuit-switched connection between the wireless device 100 and another entity for voice communications, the wireless device 100 might alternatively establish a data connection with the WWAN in order to engage in packet-switched communications with another entity. In addition to interfacing with the MSC 106 and in turn the PDSN 108, the BSC 104 may also interface with a packet data serving node ("PDSN") 110. The PDSN 110 can provide connectivity to a packet-switched network, such as the Internet 112, an intranet or another packet-switched network.

Using this connectivity, the wireless device 100 can establish a data connection with the WWAN and engage in packet-based communications with devices on a packet switched network, such as the Internet 112. For example, the wireless device 100 might use various protocols to engage in data communications with another device. The wireless device 100 might also use packet based voice protocols such as VoIP to engage in voice communications with another device via the wireless device's data connection with the WWAN.

In accessing the WWAN for data services, the wireless device 100 may establish a Point-to-Point Protocol ("PPP") session with the PDSN 110. As is known in the art, PPP can be used as a data link protocol for communication between two devices. PPP can provide a method for framing data sent between the two devices. Additionally, it can implement a link control protocol for controlling transmission links between the two devices, and it can provide a way to negotiate higher level protocol options for communication between the two devices. PPP is described in more detail in Internet Engineering Task Force ("IETF") Request for Comments ("RFCs") 1661, 1662 and 1663, all of which are incorporated herein by reference in their entirety.

While the wireless device 100 may communicate with the PDSN 110 through a PPP session, it may communicate with other devices (e.g., a device on the Internet 112) using higher level protocols. For example, the wireless device 100 may use the Transmission Control Protocol ("TCP")/Internet Protocol ("IP") suite. TCP/IP is one protocol suite that may be used for transmitting data over a packet-switched network. IP provides a method for transmitting data between devices on the same or on different networks. TCP is a connection-oriented protocol used to send data between devices connected over a network, and it provides additional features over IP, such as reliable end-to-end transmission of data. When used in conjunction, TCP and IP provide a format for breaking a data message into packets, transmitting the packets over the network to a receiver, and reassembling the packets at the receiver to form the original data message.

3. Exemplary Operation

Figure 3A:
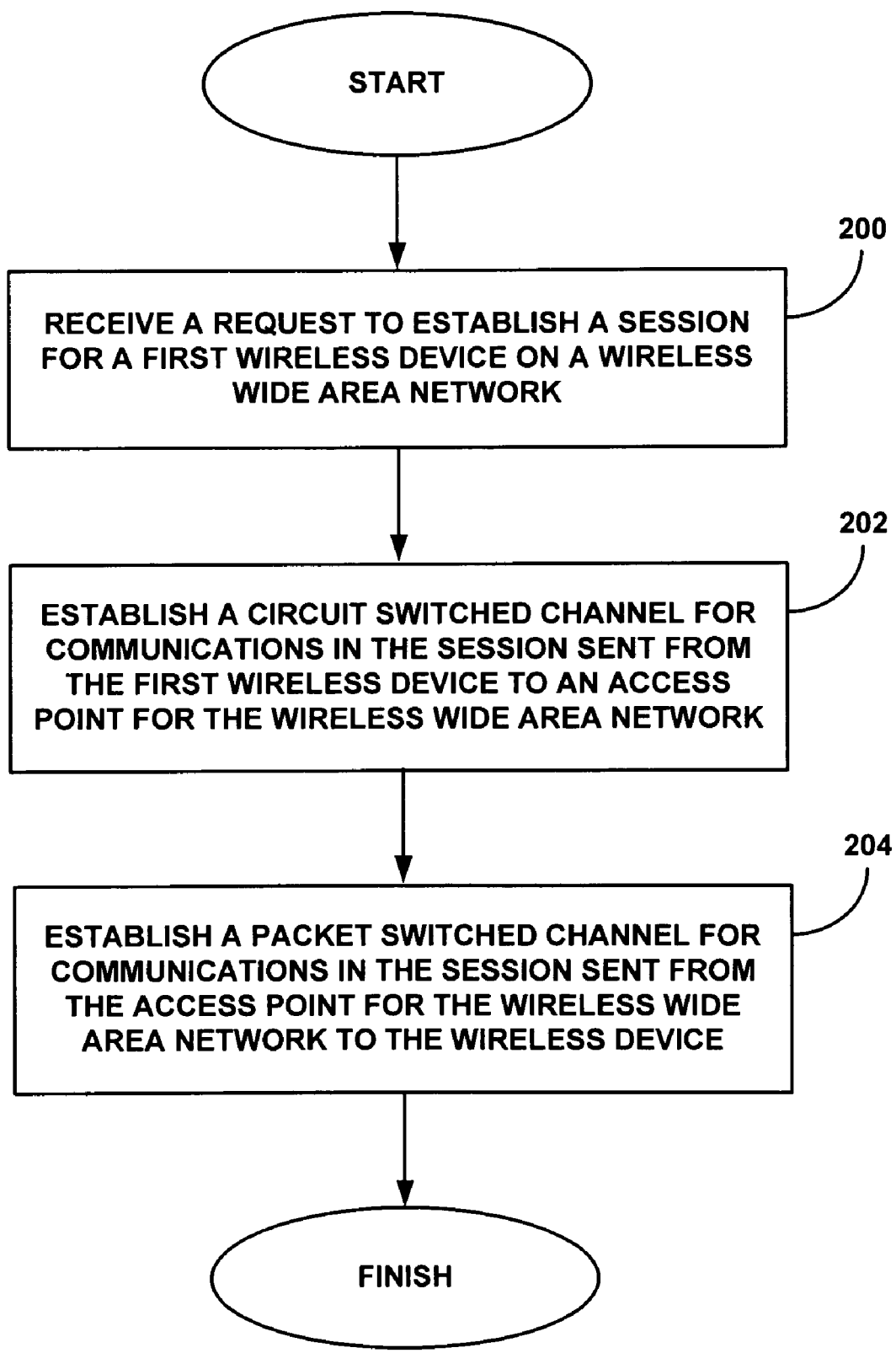
FIG. 3A is a flowchart of an exemplary method for establishing a session on a wireless wide area network with asymmetric uplink and downlink channels.

FIG. 3A is a flowchart of an exemplary method for establishing a session on a wireless wide area network with asymmetric uplink and downlink channels. It might be used, for example, by an access point to establish a Voice over Internet Protocol call for a wireless device on the wireless wide area network. Alternatively, the method might be used to establish other types of voice or data sessions.

At Step 200, an access point for a wireless wide area network receives a request to establish a session for a first wireless device on the wireless wide area network. The request might originate from the first wireless device, and therefore be sent from the first wireless device to the access point. For example, a user of the first wireless device might initiate a voice call from the first wireless device, such as by dialing the seven or ten digit number of the device the user wants to call. The first wireless device can in turn send this request to the access point for the wireless wide area network in order to establish a call to the dialed number. Upon receiving the request, the access point can proceed to establish the call.

At Step 202, the access point establishes a circuit switched channel for communications in the session sent from the first wireless device to the access point for the wireless wide area network. At Step 204, the access point establishes a packet switched channel for communications in the session sent from the access point for the wireless wide area network to the first wireless device. Thus, as illustrated in this exemplary method, the access point establishes the call asynchronously, such that traffic between the wireless device and the access point in one direction uses one type of channel while traffic in the other direction uses a different type of channel.

In one exemplary operation, the first wireless device might send the access point a request to establish a VoIP call on the wireless wide area network. This call might be to a device that is also on the wireless wide area network, or it might be to a device that is on some other network. From the perspective of the first wireless device, the request might be a request to initiate a session (e.g., a VoIP session) in which both the uplink and downlink channels are packet switched channels. Upon receiving the request, however, the access point might decide to establish one of the channels as a packet switched channel and the other channel as a circuit switched channel.

For example, the access point might establish all VoIP calls (or other types of sessions) asynchronously such that the uplink channel is a circuit switched channel and the downlink channel is a packet switched channel. In another example, the access point might first evaluate the load of the sector served by the access point. If the load is below a predetermined threshold, then the access point might establish the call such that both the uplink and downlink channels are packet switched channels. However, if the load is above a predetermined threshold, then the access point might establish the call asynchronously such that the uplink channel is a circuit switched channel and the downlink channel is a packet switched channel. These are merely examples, and other methods for determining whether to establish the call asynchronously might also be used.

When the access point receives a request to establish a session for a first wireless device on the wireless wide area network, the request might be from the first wireless device itself. Alternatively, the request might originate from another device, such as when a VoIP call is placed from another device to the first wireless device. In this case, the access point can receive the request from the originating device, although likely not directly but through various other network elements. In fact, the access point might not even receive the request that originated from the other device but might instead receive other requests (e.g., signals or notifications) that are triggered based on the original request. Once the access point receives the request to establish the call, it might then initiate the call with the first wireless device on the wireless wide area network.

Figure 3B:
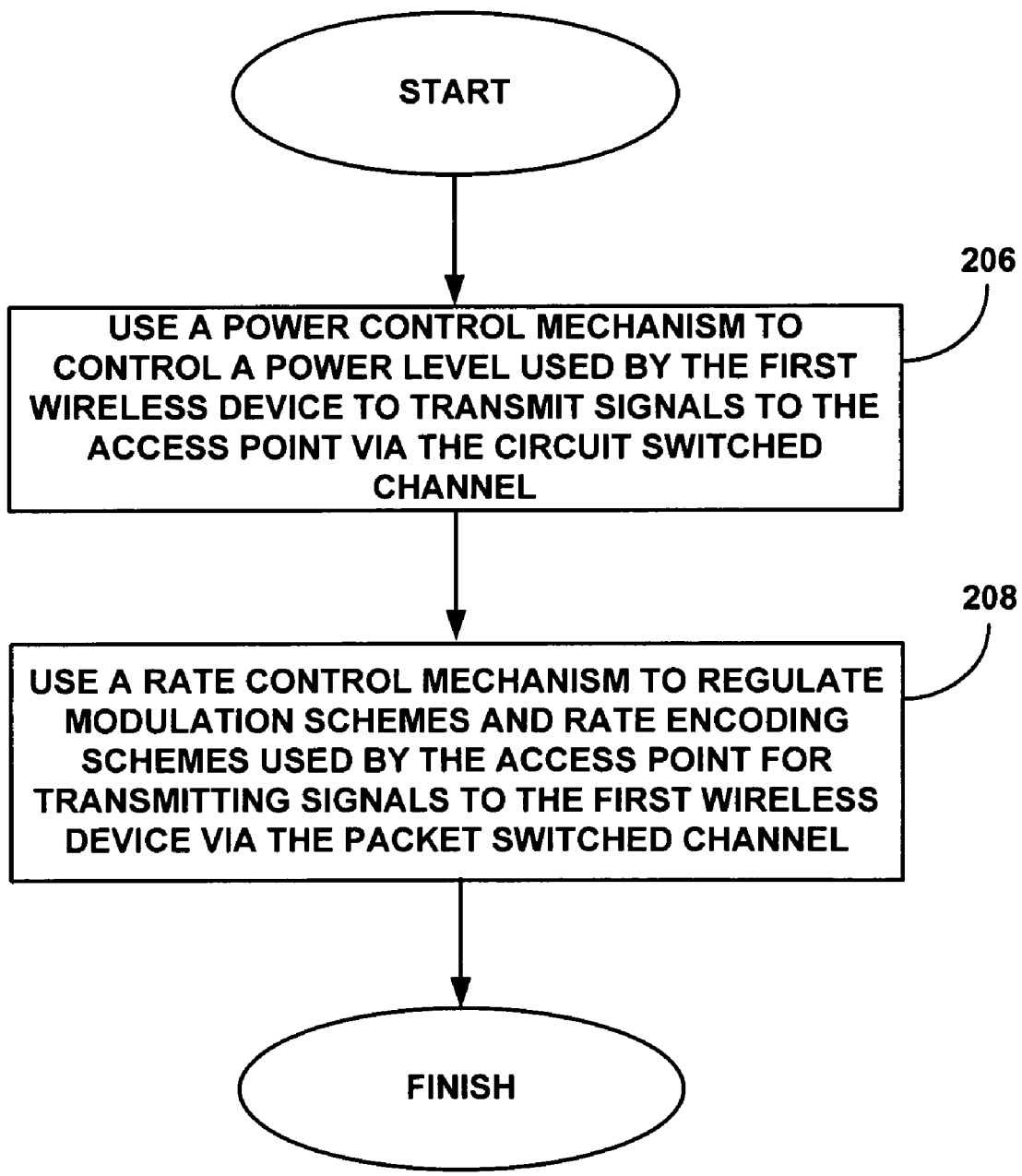
FIG. 3B is a flowchart of exemplary control methods that can be implemented by the access point, such as after establishing a session according to the method of FIG. 3A.

Once the session has been established, the access point can use various control schemes on the circuit switched and packet switched channels. FIG. 3B is a flowchart of exemplary control methods that can be implemented by the access point, such as after establishing a session according to the method of FIG. 3A. At Step 206, the access point uses a power control mechanism to control a power level used by the first wireless device to transmit signals to the access point via the circuit switched channel. At Step 208, the access point uses a rate control mechanism to regulate modulation schemes and rate encoding schemes used by the access point for transmitting signals to the first wireless device via the packet switched channel.

Depending on the particular wireless wide area network implementation, the access point might employ a variety of different type of power control and/or rate control mechanisms. In a CDMA network, for example, a base station typically covers a sector of the CDMA network, and wireless devices within that sector access the CDMA network through the access point. Some wireless devices, however, may be relatively closer to the base station (e.g., wireless devices closer to the center of the sector), while other wireless devices may be relatively farther away from the base station (e.g., wireless devices toward the edges of the sector).

The signals from wireless devices closer to the base station might tend to overpower signals from wireless devices farther away from the base station. Because these signals travel a shorter distance than those from wireless devices that are farther away, they are generally subject to less attenuation and therefore are received more strongly at the access point. In order to reduce interference with signals from mobile stations that are farther away, the access point generally instructs wireless devices that are closer to the access point to transmit using a lower power level and instructs wireless devices that are farther away from the access point to transmit using a higher power level. In addition to allowing the access point to more accurately receive signals from wireless devices that are father away, this type of power control might also conserve battery power in the wireless devices.

While the access point might use power control methods on the circuit switched channel, it might alternatively use rate control methods on the packet switched channel. The rate control methods can be used, for example, to vary the modulation schemes and rate encoding schemes used by the access point when transmitting signals to the wireless device. For example, the wireless device can measure the signal-to-noise ratio ("SNR") of signals it receives from the access point. In some implementations the wireless device might measure a signal to interference-plus-noise ratio ("SINR"). The wireless device can then send this SNR to the access point, which can use that information as part of employing the rate control methods.

Upon receiving the SNR or other such information, the access point might select a particular modulation scheme and/or rate encoding scheme to be used when transmitting signals from the access point to the wireless device. For example, the access point might consult a lookup table or other mechanism that correlates a particular SNR with a modulation scheme and/or rate encoding scheme to be used by the access point. Certain modulation schemes and rate encoding schemes might be better for sending signals over longer distances (e.g., to wireless devices at the edges of the sectors), while some might be better at supporting higher data rates at the expense of greater attenuation over longer distances.

Figure 4:
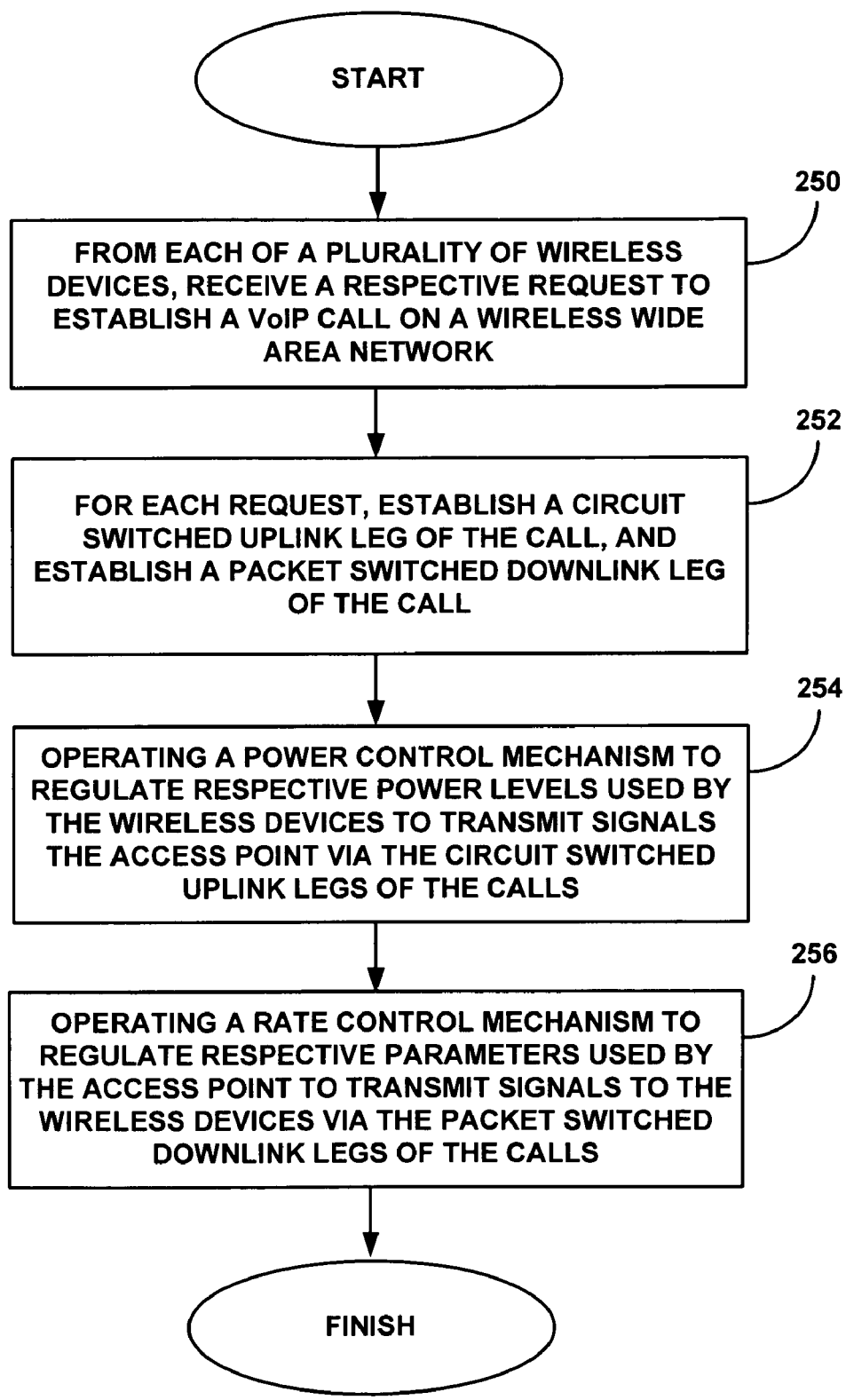
FIG. 4 is a flowchart of an exemplary method for establishing Voice over Internet Protocol calls on a wireless wide area network.

FIG. 4 is a flowchart of an exemplary method for establishing Voice over Internet Protocol ("VoIP") calls on a wireless wide area network. At Step 250, for each of a plurality of wireless devices, an access point for the wireless wide area network receives a respective request to establish a VoIP call on the wireless wide area network. That is, a wireless device might send its own request to the access point to establish a VoIP call for that wireless device. Alternatively, the access point might receive a request originating from another device to establish a call, such as where the VoIP call is not initiated by a wireless device on the wide area network but rather is placed to the wireless device on the wide area network.

At Step 252, for each request, the access point establishes a circuit switched uplink leg of the call for communications from the wireless device to the access point for the wireless wide area network, and establishes a packet switched downlink leg of the call for communications from the access point to the wireless device. Thus, the access point might support multiple calls from different wireless devices, and each of the calls might be established asynchronously such that one leg of the call is circuit switched and one leg of the call is packet switched, although all of the calls established by the access point are not necessarily established asynchronously.

At Step 254, the access point operates a power control mechanism to regulate respective power levels used by the wireless devices to transmit signals to the access point via the circuit switched uplink legs of the call. And, at Step 256, the access point operates a rate control mechanism to regulate respective parameters used by the access point to transmit signals to the wireless devices via the packet switched downlink legs of the calls.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams. The claims should not be read as limited to the described order or elements unless stated to that effect.

In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for establishing Voice over Internet Protocol ("VoIP") calls on a wireless wide area network, the method comprising:

from each of a plurality of wireless devices, receiving a respective request to establish a VoIP call on a wireless wide area network;

for each request, establishing a circuit switched uplink leg of the call for communications from the wireless device to an access point for the wireless wide area network, and establishing a packet switched downlink leg of the call for communications from the access point to the wireless device;

operating a power control mechanism to regulate respective power levels used by the wireless devices to transmit signals to the access point via the circuit switched uplink legs of the calls, wherein operating the power control mechanism for a wireless device comprises (i) measuring an error rate for signals received at the access point from the wireless device, (ii) if the error rate is above a first predetermined threshold, instructing the wireless device to increase a power level used for transmitting signals to the access point, and (iii) if the error rate is below a second predetermined threshold, instructing the wireless device to decrease the power level used for transmitting signals to the access point; and operating a rate control mechanism to regulate respective parameters used by the access point to transmit signals to the wireless devices via the packet switched downlink legs of the calls.

2. The method of claim 1, wherein operating a rate control mechanism comprises:

for a wireless device, receiving from the wireless device an indication of a signal-to-noise ratio of signals received from the access point at the wireless device; and based on the signal-to-noise ratio, adjusting parameters used by the access point to transmit signals to the wireless device.

3. The method of claim 2, wherein the signal-to-noise ratio is a signal to interference-plus-noise ratio, and wherein the parameters include a modulation scheme or an encoding scheme.

4. The method of claim 1, wherein the access point is a base station, and wherein the wireless wide area network is a CDMA or TDMA network.

5. The method of claim 4, wherein the wireless device is a mobile phone.

* * * * *